Sept. 18, 1945.  W. HUBER  2,384,919
TURBINE BLADE ATTACHMENT BY WELDING
Filed Aug. 25, 1943  2 Sheets-Sheet 1

INVENTOR
Walter Huber
BY
ATTORNEYS

Sept. 18, 1945. W. HUBER 2,384,919
TURBINE BLADE ATTACHMENT BY WELDING
Filed Aug. 25, 1943 2 Sheets-Sheet 2
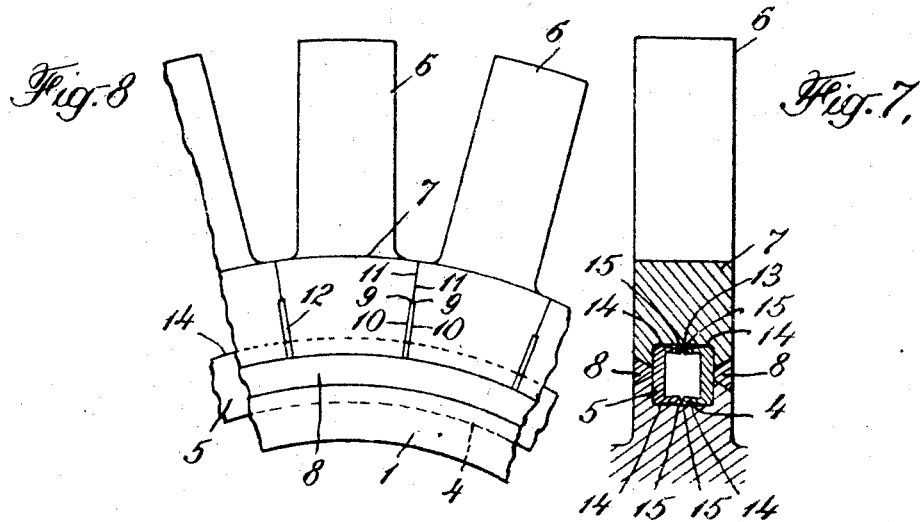
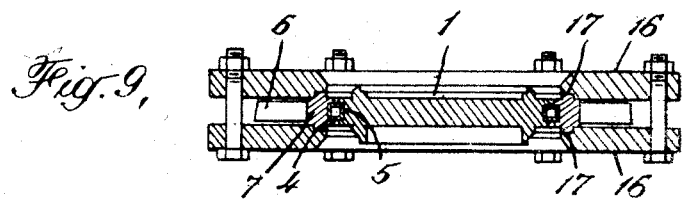
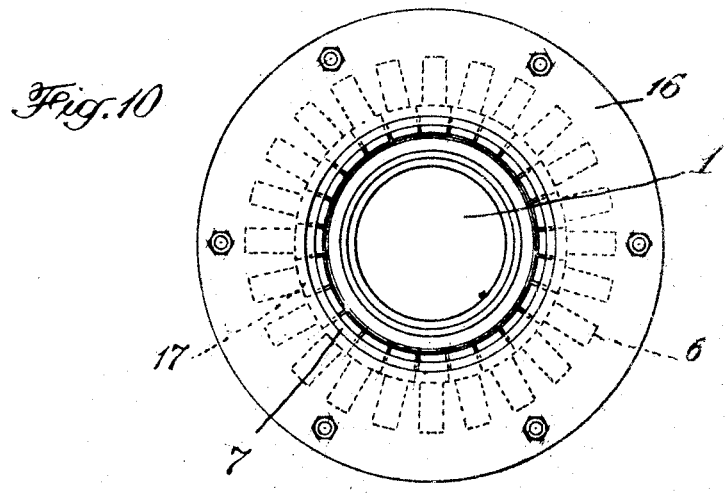
INVENTOR
WALTER HUBER
BY
Pennie, Davis, Marvin Edmonds
ATTORNEYS Patented Sept. 18, 1945

2,384,919

UNITED STATES PATENT OFFICE 2,384,919

TURBINE BLADE ATTACHMENT BY WELDING

Walter Huber, Winterthur, Switzerland, assignor to Sulzer Freres, Société Anonyme, Winterthur, Switzerland Application August 25, 1943, Serial No. 499,911
In Switzerland November 5, 1942

8 Claims. (Cl. 253—77)

The invention relates to a turbo-machine of any application having blades attached to the blade carrier by welding. The distinguishing characteristic of the invention consists in that the blade roots are fork-shaped design, are fitted astraddle over a ring situated in a groove of the blade carrier and are welded to the blade carrier at the points of the forks.

It is advantageous for the ring to be provided not only with one or more rigid supporting shoulders but also with one or more yielding supporting shoulders, in such a way that the blades lie upon the yielding shoulders before welding, while after welding, on account of the forces exerted by the shrinkage of the cooling weld and of the resulting deformation of the yielding shoulders, they are pressed on to the rigid shoulders of the ring.

To facilitate insertion into the groove of the blade carrier it is preferabl that the ring be divided in a radial direction at one or more points on its circumference. The ring may also have one or more divisions in a direction at right angles to the axis. Each part may be provided with one or more rigid shoulders and one or more yielding shoulders. The yielding shoulders of both parts may then be situated between the rigid shoulders of both parts.

The opposing flanks of the blade roots may to advantage be stepped in such a way that, after welding, the blades are in contact only at the unstepped parts. After welding it is advisable to close up the spaces formed by the stepping. The blade roots should be so divided that, before welding, a space remains between the blades and also between the unstepped parts of the roots, which space disappears or almost disappears as a result of shrinkage when cooling sets in after welding.

During welding, the blades may be held in the correct position by a clamping device. The blades may, for example, be provided with projecting edges with the help of which they are held by the clamping device during welding.

The invention is further explained below with the aid of the drawings.

Figs. 5 to 8 show another form of blade execution before and after welding.

Figs. 9 and 10 show a cross-section and a ground plan of a clamping device for the blades during welding.

Figure 1:
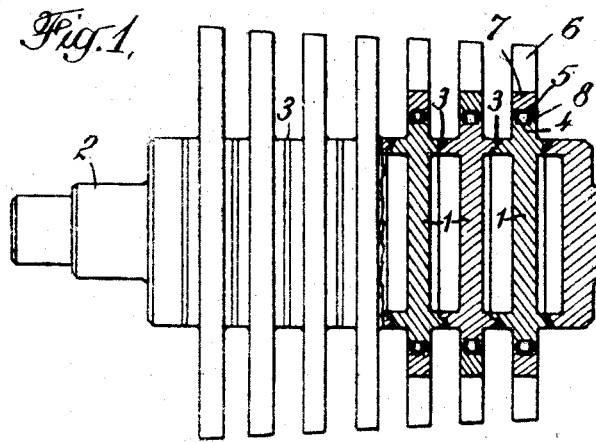
Figs. 1 and 2 show partly a longitudinal section and partly a side elevation or front elevation of a simplified example of execution.
Figure 2:
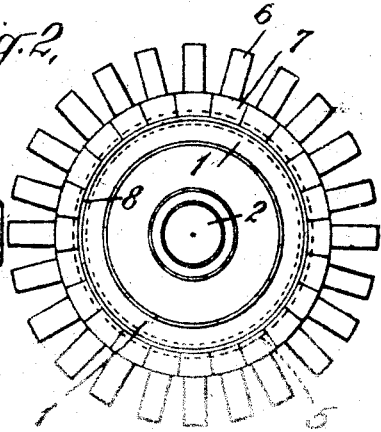

The rotor according to Figs. 1 and 2, which may be equally well employed for a turbine or for an axial compressor, is composed of discs 1 and sections 2 of the axis. The single rotor parts are connected to each other by welded seams 3. Each disc has around its circumference a groove 4, in which a ring 5 is placed.

The blades 6 have roots 7 designed in forked form, with which they are set astraddle over ring 5. By means of the welded seams 8 blades 6 are finally joined to the discs at their forked points.

Figure 4:
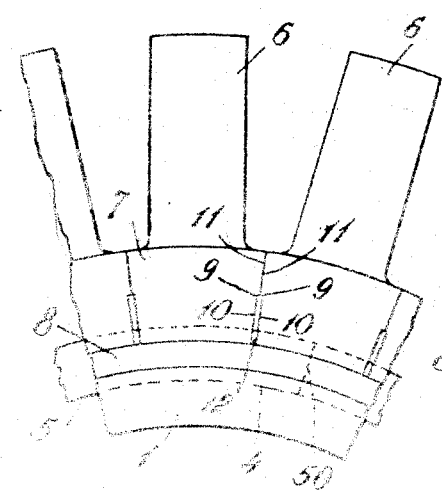
Figs. 3 and 4 represent in two projections at right angles to each other and on a larger scale the blade execution of the turbo-machine according to Figs. 1 and 2.

The opposing flanks 9 (Figs. 3 and 4) of the blade roots 7 are stepped at surfaces 10, so that they can only touch at the unstepped parts 11. The spaces 12 formed by the stepping can be filled after welding with inserted pieces, which are secured against falling out by caulking. Ring 5 is divided in a radial direction at point 50 in order to facilitate insertion into the groove. The ring can be sprung open and pushed over the outer circumference of the discs into the groove.

The blades according to Figs. 5 to 8 are placed over a ring 5, which is divided at right angles to the axis at point 13. Each part of the ring is provided with two rigid shoulders 14 and two yielding shoulders 15. The yielding shoulders 15 are situated between the rigid shoulders 14. Before welding (Figs. 5 and 6) the blades rest on the yielding shoulders 15. Similarly the rings rest with their yielding shoulders on the bottom surface of the groove.

The shoulders are so designed and proportioned that the distance $x$ remains between the rigid shoulders and the blades or the bottom surface of the groove when the yielding shoulders lie against the blades and the bottom surface of the groove. Similarly a distance $y$ is preserved between the unstepped parts 11 of flanks 9. It is possible, for instance, to insert distance plates temporarily between the flanks of the blades, but these plates must be removed before welding.

When blades 6 are welded to the wheel disc 1, not only the weld metal, but also the basic metal of the blades and discs situated in the neighbourhood of the welded seam is highly heated. During the cooling which follows the basic metal and particularly the welded seam contract. During this process the yielding shoulders 15, as is shown in Fig. 7, are bent apart, so that the rigid shoulders 14 come to lie against the blades and the bottom surface of the groove. During the shrinkage which accompanies cooling the spaces y between flanks 11 will also disappear or almost disappear, so that the blades after welding (Fig. 8) will practically lie against each other.

During welding the blades are held in the correct position by a clamping device 16 (Figs. 9 and 10). Each blade is provided before welding with a projecting edge 17, which fits into a corresponding recess in the clamping device 16, so that the blades are held exactly in radial direction during the welding. The clamping device has the further advantage of protecting the blades from damage during welding.

Figure 3:
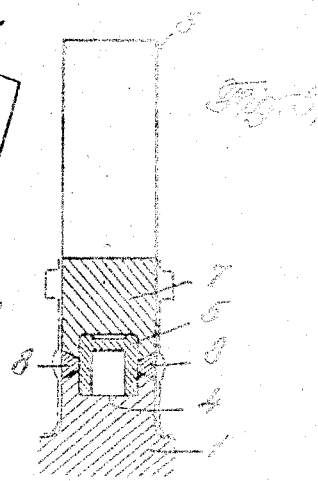
Figure 5:
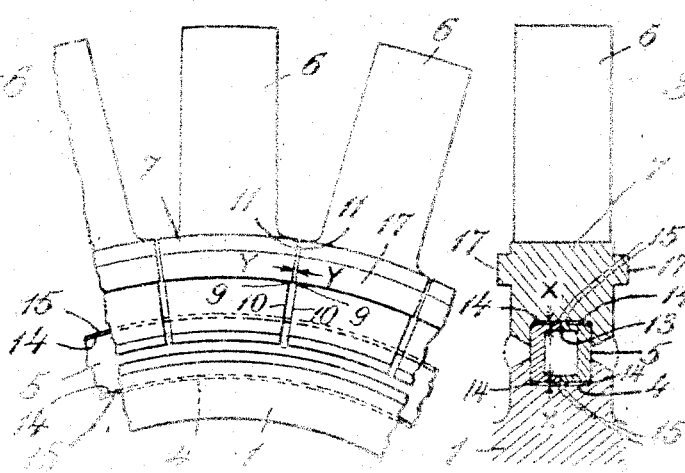
Figure 6:
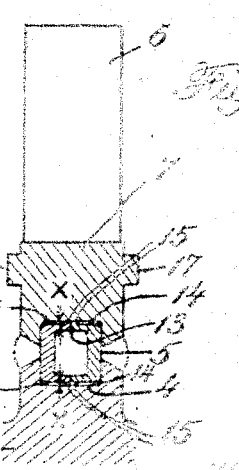

After welding, as is shown for example in Figs. 3 and 7, both the projecting edge on the blades and the outer part of the welded seam can be removed by machining, for example by turning. Hence it follows that the blades are first welded on, then the machining of the disc is completed and only after this are the finished discs with their blades connected together to form a rotor.

In the manner described it is possible to attach all possible kinds of blades of turbo-machines, such as also blades of turbo-machines with radial flow, to the blade carrier, and the invention can be equally well applied to impeller or to guide blades.

I claim:

1. A turbo-machine which comprises at least one disc, a groove in the periphery of the disc, a ring mounted in the groove, said ring having rigid supporting shoulders and yielding supporting shoulders, a plurality of blades each having a groove in its root for mounting the blades astraddle over the ring, means to weld the blades to the disc on each side of the ring, so that prior to welding said blades lie on the yielding shoulders and after welding and contracting said blades lie on the rigid shoulders, and spacer means between adjacent blades to permit circumferential shrinkage after welding.

2. A turbo-machine according to claim 1 in which said ring is divided in a radial direction at one or more points on its circumference.

3. A turbo-machine according to claim 1 in which said ring has one or more divisions in a direction at right angles to the axis.

4. A turbo-machine according to claim 1 in which said ring has a rigid supporting shoulder near each side edge thereof and a yielding shoulder located between the rigid shoulders, said shoulders being on the periphery of the ring.

5. A turbo-machine according to claim 1 in which said blade roots have radially disposed contacting faces which are stepped whereby contacting blade roots have a cutout portion.

6. A turbo-machine according to claim 1 in which each of said blades has a projecting edge on the exterior side to engage a clamping means used to secure the blades during welding.

7. A turbo-machine which comprises at least one disc, a groove in the periphery of the disc, a ring mounted in the groove, a plurality of blades each having a groove in its root for mounting the blades astraddle over the ring, said ring having at least one rigid shoulder on the interior periphery for engaging the disc and at least one rigid shoulder on the exterior periphery for engaging the blades and yielding means for supporting said blades during welding, means for welding the blades to the side portions of the disc so that prior to welding said yielding means support the blades spaced from the disc and after welding yield permitting the rigid shoulder on the interior to lie on the disc and blades to lie on the rigid shoulders, and spacer means between the adjacent faces of the blade roots prior to welding which close as a result of the contracting following welding.

8. A turbo-machine which comprises at least one disc, a groove in the periphery of the disc, a ring mounted in the groove, a plurality of blades each having a groove in its root for mounting the blades astraddle over the ring, said ring having at least one rigid shoulder on the interior periphery for engaging the disc and at least one rigid shoulder on the exterior periphery for engaging the blades and yielding means for supporting said blades during welding, and means for welding the blades to the side portions of the disc, so that prior to welding said yielding means support the blades spaced from the disc and after welding yield permitting the rigid shoulder on the interior to lie on the disc and blades to lie on the rigid shoulders.

WALTER HUBER.